United States Patent
Chae et al.

(10) Patent No.: US 10,490,821 B2
(45) Date of Patent: Nov. 26, 2019

(54) ELECTRODE FOR LITHIUM SECONDARY BATTERY COMPRISING HYGROSCOPIC MATERIAL AND LITHIUM SECONDARY BATTERY COMPRISING THE SAME

(71) Applicant: LG Chem, Ltd., Seoul (KR)

(72) Inventors: Oh Byong Chae, Daejeon (KR); Yoon Ah Kang, Daejeon (KR); Eun Kyung Kim, Daejeon (KR); Sun Young Shin, Daejeon (KR)

(73) Assignee: LG Chem, Ltd. (KR)

( * ) Notice: Subject to any disclaimer, the term of this patent is extended or adjusted under 35 U.S.C. 154(b) by 97 days.

(21) Appl. No.: 15/348,284

(22) Filed: Nov. 10, 2016

(65) Prior Publication Data

US 2017/0133685 A1    May 11, 2017

(30) Foreign Application Priority Data

Nov. 11, 2015 (KR) .................. 10-2015-0158422
Oct. 31, 2016 (KR) .................. 10-2016-0143357

(51) Int. Cl.

| | |
|---|---|
| *H01M 4/62* | (2006.01) |
| *H01M 10/0525* | (2010.01) |
| *H01M 4/66* | (2006.01) |
| *H01M 4/133* | (2010.01) |
| *H01M 4/1393* | (2010.01) |

(Continued)

(52) U.S. Cl.
CPC ............ *H01M 4/628* (2013.01); *H01M 4/13* (2013.01); *H01M 4/133* (2013.01); *H01M 4/1393* (2013.01); *H01M 4/622* (2013.01); *H01M 4/625* (2013.01); *H01M 4/661* (2013.01); *H01M 10/0525* (2013.01); *H01M 2004/021* (2013.01); *Y02T 10/7011* (2013.01)

(58) Field of Classification Search
None
See application file for complete search history.

(56) References Cited

U.S. PATENT DOCUMENTS

| | | | | |
|---|---|---|---|---|
| 5,474,858 | A | * 12/1995 | Merritt .................. | H01M 4/62 429/114 |
| 2013/0071741 | A1 | * 3/2013 | Ohara .................... | H01M 4/62 429/212 |
| 2016/0336614 | A1 | * 11/2016 | Hatta ...................... | B60K 6/46 |

FOREIGN PATENT DOCUMENTS

| | | |
|---|---|---|
| CN | 1571198 A | 1/2005 |
| CN | 2694501 Y | 4/2005 |

(Continued)

OTHER PUBLICATIONS

Chinese Search Report for Application CN201609979755 dated Aug. 28, 2018.

*Primary Examiner* — Alix E Eggerding
(74) *Attorney, Agent, or Firm* — Lerner, David, Littenberg, Krumholz & Mentlik, LLP

(57) ABSTRACT

Provided is an electrode for a lithium secondary battery in which a hygroscopic material is disposed in pores which are formed by arranging an active material in an active material layer, wherein, since the electrode for a lithium secondary battery according to the present invention may remove moisture present in the electrode and an electrolyte solution by disposing the hygroscopic material in the pores which are formed by the active material in the active material layer, a side reaction due to the presence of moisture in the battery may be excluded, and thus, the performance of the battery may be improved.

12 Claims, 4 Drawing Sheets

(51) Int. Cl.
*H01M 4/13* (2010.01)
*H01M 4/02* (2006.01)

(56) References Cited

FOREIGN PATENT DOCUMENTS

| CN | 102934262 A | 2/2013 |
| JP | 2015138597 A | 7/2015 |
| KR | 20140134541 A | 11/2014 |
| KR | 20150037332 A | 4/2015 |

* cited by examiner

ELECTRODE FOR LITHIUM SECONDARY BATTERY COMPRISING HYGROSCOPIC MATERIAL AND LITHIUM SECONDARY BATTERY COMPRISING THE SAME

CROSS-REFERENCE TO RELATED APPLICATIONS

The present application claims priority to and the benefits of Korean Patent Application No. 10-2015-0158422 filed with the Korean Intellectual Property Office on Nov. 11, 2015, and Korean Patent Application No. 10-2016-0143357 filed with the Korean Intellectual Property Office on Oct. 31, 2016, the entire contents of which are incorporated herein by reference.

TECHNICAL FIELD

The present invention relates to an electrode for a lithium secondary battery comprising a hygroscopic material and a lithium secondary battery comprising the same, and more particularly, to an electrode for a lithium secondary battery, which may improve a battery performance by comprising a hygroscopic material for removing microscopic moisture of an electrode, and a lithium secondary battery comprising the same.

BACKGROUND ART

Demand for secondary batteries as an energy source has been significantly increased as technology development and demand with respect to mobile devices have increased. Among these secondary batteries, lithium secondary batteries having high energy density, high operating potential, long cycle life, and low self-discharging rate have been commercialized and widely used.

Also, in line with growing concerns about environmental issues recently, a significant amount of research into electric vehicles (EVs) and hybrid electric vehicles (HEVs), which may replace vehicles using fossil fuels, such as gasoline vehicle and diesel vehicle, one of major causes of air pollution, has been conducted. Nickel-metal hydride (Ni-MH) secondary batteries have been mainly used as power sources of the electric vehicles (EVs) and hybrid electric vehicles (HEVs). However, research into the use of lithium secondary batteries having high energy density, high discharge voltage, and output stability has been actively conducted and some of the researches are in a commercialization stage.

A lithium secondary battery is composed of a structure in which an electrode assembly, in which a porous separator is disposed between a positive electrode and a negative electrode in which electrode collectors are coated with each active material, is impregnated with a non-aqueous electrolyte.

In a case in which moisture is included in the lithium secondary battery, it may be a cause of performance degradation of the battery. The moisture in the lithium secondary battery may be included in the active material during a manufacturing process or may be included in the form in which a trace amount is present in an electrolyte solution. For example, a lithium titanium oxide used as a negative electrode active material is a zero-strain material in which structural changes are extremely low during charging and discharging, wherein, since lifetime characteristics are relatively excellent, a relatively high voltage range is available, and dendrites do not occur, the lithium titanium oxide is known as a material having excellent safety and stability. Also, the lithium titanium oxide may have characteristics of fast-charging electrode in which charging is possible within a few minutes, but, in a case in which an electrode is prepared by using the lithium titanium oxide, since the lithium titanium oxide has a property of absorbing moisture in the air, the contained moisture may be decomposed to generate a large amount of gas.

Furthermore, since the moisture present in the electrolyte solution may react with the electrolyte solution due to potential energy provided during the charging, the moisture may reduce reliability of the battery, for example, gas may be generated to cause a swelling phenomenon of a cell. For example, a $LiPF_6$ lithium salt included in the electrolyte solution may react with water to form HF, a strong acid, the formed HF may spontaneously react with the electrode active material having weak basicity to dissolute an electrode active material component, and, as a result, degradation of the battery may occur. Also, since the formed HF may form lithium fluoride (LiF) on the surface of the positive electrode to increase electrical resistance in the electrode and generate gas, the lifetime of the battery may be reduced.

Accordingly, various methods have been used to remove the moisture in the lithium secondary battery. For example, in order to remove moisture in the electrode of the lithium secondary battery, the moisture of the electrode is removed by a high-temperature drying process, and, in order to remove the moisture in the electrolyte solution, a method has been used in which a moisture absorbent is disposed in a battery case (Korean Patent Application Laid-open Publication No. 2015-0037332).

However, since the moisture in the electrode may not be removed to the desired level by only the above method, there is a need to develop a new technique which may improve the battery performance by more effectively removing the moisture in the electrode.

DISCLOSURE OF THE INVENTION

Technical Problem

An aspect of the present invention provides an electrode for a lithium secondary battery which may improve performance of a battery by effectively removing moisture, which may be included in the electrode and an electrolyte of the lithium secondary battery, by comprising a hygroscopic material.

Another aspect of the present invention provides a method of preparing the above-described electrode for a lithium secondary battery comprising a hygroscopic material.

Technical Solution

According to an aspect of the present invention, there is provided an electrode for a lithium secondary battery comprising an active material layer and a current collector, wherein the active material layer comprises an active material and a hygroscopic material, and the hygroscopic material is disposed in pores which are formed by arranging the active material in the active material layer.

According to another aspect of the present invention, there is provided a method of preparing an electrode for a lithium secondary battery comprising the steps of: (1) coating a slurry including an active material on a current collector to form an active material layer; and (2) infiltrating a dispersion solution comprising a hygroscopic material into the active material layer to allow the hygroscopic material to be disposed in pores which are formed by arranging the active material.

Advantageous Effects

Since an electrode for a lithium secondary battery according to the present invention may remove moisture present in the electrode and an electrolyte solution by disposing a hygroscopic material in pores which are formed by an active material in an active material layer, a side reaction due to the presence of moisture in the battery may be excluded, and thus, the performance of the battery may be improved.

BRIEF DESCRIPTION OF THE DRAWINGS

The following drawings attached to the specification illustrate preferred examples of the present invention by example, and serve to enable technical concepts of the present invention to be further understood together with detailed description of the invention given below, and therefore the present invention should not be interpreted only with matters in such drawings.

MODE FOR CARRYING OUT THE INVENTION

Figure 1:
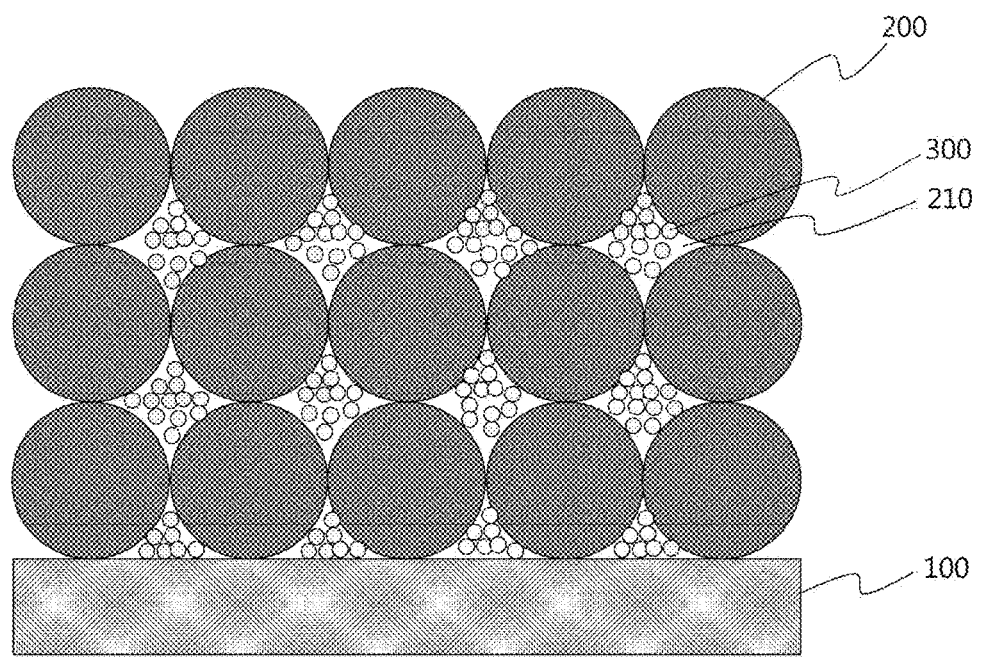
FIG. 1 is a schematic view illustrating a configuration in which a hygroscopic material is disposed in pores which are formed by arranging an active material in an active material layer.

Hereinafter, the present invention will be described in more detail to allow for a clearer understanding of the present invention.

It will be understood that words or terms used in the specification and claims shall not be interpreted as the meaning defined in commonly used dictionaries. It will be further understood that the words or terms should be interpreted as having a meaning that is consistent with their meaning in the context of the relevant art and the technical idea of the invention, based on the principle that an inventor may properly define the meaning of the words or terms to best explain the invention.

An electrode for a lithium secondary battery according to the present invention is an electrode for a lithium secondary battery comprising an active material layer and a current collector, wherein the active material layer comprises an active material and a hygroscopic material, and the hygroscopic material is disposed in pores which are formed by arranging the active material in the active material layer.

The hygroscopic material may function to absorb and remove moisture included in the battery, for example, moisture in an electrode and moisture in an electrolyte solution, and, since the hygroscopic material is disposed in the pores which are formed by arranging the active material, it may not cause a problem in which energy density per unit volume is reduced by increasing a total volume of the active material layer.

The hygroscopic material may include at least one selected from the group consisting of silica gel, zeolite, CaO, BaO, $MgSO_4$, $Mg(ClO_4)_2$, MgO, $P_2O_5$, $Al_2O_3$, $CaH_2$, NaH, $LiAlH_4$, $CaSO_4$, $Na_2SO_4$, $CaCO_3$, $K_2CO_3$, $CaCl_2$, 4A and 3A molecular sieves, $Ba(ClO_4)_2$, crosslinked poly(acrylic acid), and poly(acrylic acid), and may specifically include at least one selected from the group consisting of silica gel, zeolite, $P_2O_5$, and $Al_2O_3$.

The active material may have an average particle diameter ($D_{50}$) of 0.1 μm to 30 μm, particularly 0.5 μm to 10 μm, and more particularly 1 μm to 5 μm.

When the active material has an average particle diameter ($D_{50}$) of 0.1 μm to 30 μm, the pores formed by arranging the active material may have a size of 0.01 μm to 20 μm, particularly 0.03 μm to 10 μm, and more particularly 0.05 μm to 5 μm. In this case, when it is assumed that there is a sphere inscribed in the pore, the size of the pore may be represented by a diameter of the sphere.

The hygroscopic material may have an average particle diameter ($D_{50}$) of 10 nm to 20 μm, particularly 30 nm to 10 μm, and more particularly 50 nm to 5 μm so as to be included in the pores formed by arranging the active material.

The size of the hygroscopic material may be proportional to the size of the active material, and, for example, the hygroscopic material may have an average particle diameter ($D_{50}$) of 0.1% to 70%, particularly 1% to 67%, and more particularly 5% to 50% of the average particle diameter ($D_{50}$) of the active material.

In a case in which the hygroscopic material has an average particle diameter of 0.1% or more of the average particle diameter of the active material, a problem may not occur in which the hygroscopic material tightly fills the pores, which are formed by arranging the active material, to block paths through which the electrolyte impregnates, and, in a case in which the hygroscopic material has an average particle diameter of 70% or less of the average particle diameter of the active material, a problem may not occur in which the hygroscopic material is enlarged relative to the size of the pores to reduce the energy density per unit volume by being disposed at a portion other than in the pores, preventing contact between the active material particles, or increasing the total volume of the active material layer.

In the present invention, the average particle diameter ($D_{50}$) may be defined as a particle diameter at 50% in a cumulative particle diameter distribution. Although it is not particularly limited, the average particle diameter, for example, may be measured by using a laser diffraction method or scanning electron microscope (SEM) image. The laser diffraction method may generally measure a particle diameter ranging from a submicron level to a few mm, and may obtain highly repeatable and high resolution results.

The hygroscopic material may be included in an amount of 1 part by weight to 20 parts by weight, particularly 2 parts by weight to 10 parts by weight, and more particularly 3 parts by weight to 7 parts by weight based on 100 parts by weight of the active material.

When the amount of the hygroscopic material is 1 part by weight or more based on 100 parts by weight of the active material, a proper moisture absorption effect may be obtained, and, when the amount of the hygroscopic material is 20 parts by weight or less, it is possible to prevent a problem in which the energy density per unit volume is reduced by excessively decreasing the pores of the active material layer, preventing the contact between the active material particles, or increasing the total volume of the active material layer.

The hygroscopic material may be a mixture in which two kinds of hygroscopic materials categorized by their particle diameter are mixed, and specifically, the mixture of the hygroscopic materials may be a mixture of a first hygroscopic material having a relatively large size and a second hygroscopic material having a relatively small size.

In a case in which the mixture of the first hygroscopic material having a relatively large size and the second hygroscopic material having a relatively small size is included, the hygroscopic material may be more effectively disposed in the pores between the active material particles, and accordingly, it is possible to suppress the occurrence of a phenomenon in which the total volume of the active material layer is increased due to the inclusion of the hygroscopic material and, as a result, the energy density per unit volume is reduced.

The first hygroscopic material may have an average particle diameter ($D_{50}$) of 1 µm to 20 µm, particularly 5 µm to 20 µm, and more particularly 5 µm to 10 µm, and the second hygroscopic material may have an average particle diameter ($D_{50}$) of 10 nm to 1 µm, particularly 20 nm to 500 nm, and more particularly 50 nm to 300 nm.

In this case, the first hygroscopic material and the second hygroscopic material may be mixed in a weight ratio of 60:40 to 99:1, particularly 70:30 to 98:2, and more particularly 80:20 to 95:5.

In a case in which the weight ratio of the first hygroscopic material and the second hygroscopic material satisfies the above range, an increase in volume of the active material layer may be suppressed, the moisture absorption effect may be further improved due to the uniform dispersion of the hygroscopic material, and the prevention of the infiltration of the electrolyte solution by the hygroscopic material may be prevented.

Specific types of the first hygroscopic material and the second hygroscopic material may be the same or different, but the moisture absorption effect may be maximized by appropriately combining the types of the first hygroscopic material and the second hygroscopic material.

In an exemplary embodiment of the present invention, the first hygroscopic material may be at least one selected from the group consisting of silica gel, zeolite, 4A and 3A molecular sieves, crosslinked poly(acrylic acid), and poly (acrylic acid), and the second hygroscopic material may be at least one selected from the group consisting of CaO, BaO, $MgSO_4$, $Mg(ClO_4)_2$, MgO, $P_2O_5$, $Al_2O_3$, $CaH_2$, NaH, $LiAlH_4$, $CaSO_4$, $Na_2SO_4$, $CaCO_3$, $K_2CO_3$, and $Ba(ClO_4)_2$. Specifically, the first hygroscopic material may be at least one selected from the group consisting of silica gel, zeolite, BaO, and $MgSO_4$, and the second hygroscopic material may be at least one selected from the group consisting of MgO, $P_2O_5$, and $Al_2O_3$.

The active material layer of the electrode for a lithium secondary battery may have a porosity of 10% to 40%, particularly 20% to 30%, and more particularly 25% to 30% while including the active material and the hygroscopic material.

In a case in which the porosity of the active material layer satisfies the above range, the electrolyte solution may appropriately infiltrate and a better moisture absorption effect may be obtained.

A method of disposing the hygroscopic material in the pores formed by arranging the active material is not particularly limited, but, for example, it may be performed by a method including the steps of: (1) coating a slurry including an active material on a current collector to form an active material layer; and (2) infiltrating a dispersion solution including a hygroscopic material into the active material layer to allow the hygroscopic material to be disposed in pores which are formed by arranging the active material.

In this case, a binder and a conductive agent, if necessary, are added to the active material included in the active material layer, and the slurry may be prepared by mixing with a solvent. After the infiltration of the dispersion solution, the active material layer may be further subjected to a process of compressing and drying, and, before the infiltration of the dispersion solution, the active material layer may be preferentially subjected to a process of drying. The hygroscopic material (300) may be disposed in the pores (210) which are formed by arranging the active material (200) by the above method, and it is schematically illustrated in FIG. 1.

Figure 2:
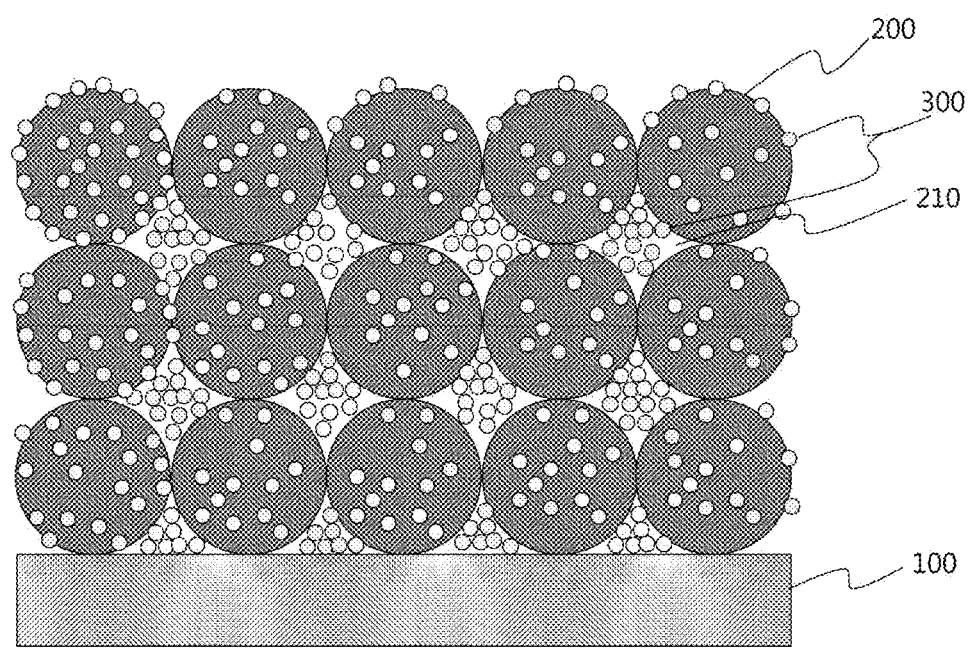
FIG. 2 is a schematic view illustrating a configuration in which the hygroscopic material is disposed on the surface of the active material.
Figure 3:
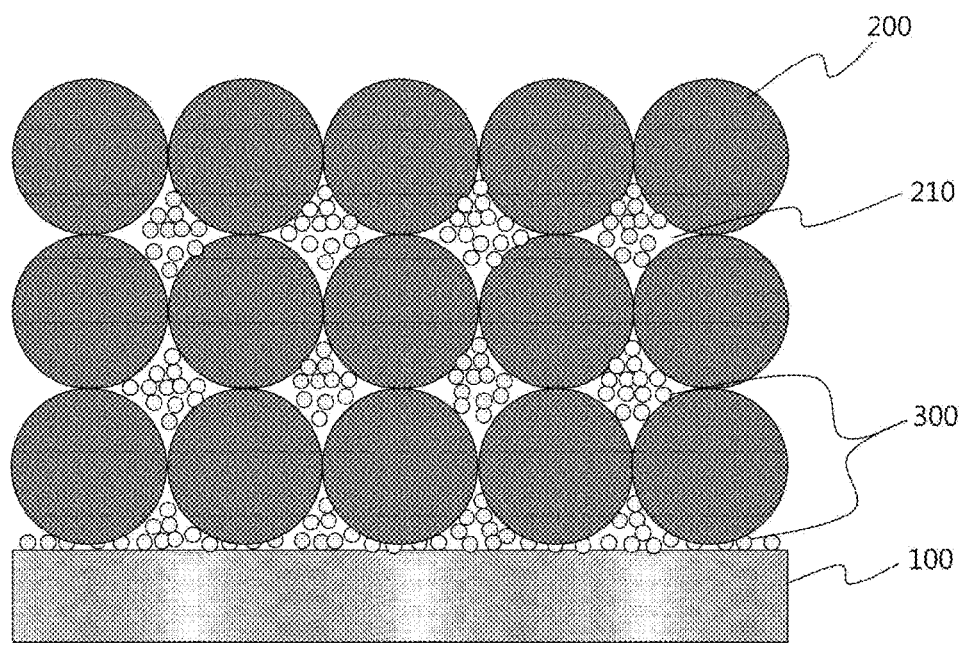
FIG. 3 is a schematic view illustrating a configuration in which the hygroscopic material is disposed between the active material and a current collector.

The hygroscopic material (300) may be disposed in other than in the pores (210) if necessary, and, for example, may be disposed on a surface of the active material (200), between the active material layer and the current collector (100), or at both positions. In a case in which the hygroscopic material (300) is disposed in other than in the pores (210), since this results in the disposition of the hygroscopic material (300) in other than in the pores (210) of the active material layer of the electrode, the presence of the more uniformly dispersed hygroscopic material (300) may have an effect of effectively absorbing the moisture in the battery. However, since the presence of the hygroscopic material (300) disposed in other than in the pores (210) may result in an increase in the total volume of the active material layer, it is necessary to appropriately adjust the amount of the hygroscopic material (300) disposed in other than in the pores (210). A configuration, in which the hygroscopic material (300) is disposed on the surface of the active material (200), is schematically illustrated in FIG. 2, and a configuration, in which the hygroscopic material (200) is disposed between the active material (200) and the current collector (100), is schematically illustrated in FIG. 3.

A method of disposing the hygroscopic material both on the surface of the active material and in the pores formed by arranging the active material is not particularly limited, but, for example, it may be performed by a method including the steps of: (1) coating a slurry comprising an active material on a current collector to form an active material layer; and (2) infiltrating a dispersion solution comprising a hygroscopic material into the active material layer to allow the hygroscopic material to be disposed in pores which are formed by arranging the active material, and further comprising the step of closely attaching the hygroscopic material to the surface of the active material by dry mixing or hard mixing of the active material and the hygroscopic material before the step (1).

The dry mixing may be performed by mixing the active material and the hygroscopic material without the addition of a binder or a thickener, and the hard mixing may be performed by high-viscosity mixing the active material and the hygroscopic material in the presence of a trace amount of a binder or a thickener.

In this case, the hygroscopic material disposed in the pores formed by arranging the active material and the hygroscopic material disposed on the surface of the active material may have a weight ratio of 99.9:0.1 to 80:20, particularly 99.5:0.5 to 90:10, and more particularly 99:1 to 95:5.

A method of disposing the hygroscopic material both between the active material and the current collector and in the pores formed by arranging the active material is not particularly limited, but, for example, it may be performed by a method including the steps of: (1) coating a slurry comprising an active material on a current collector to form an active material layer; and (2) infiltrating a dispersion solution comprising a hygroscopic material into the active material layer to allow the hygroscopic material to be disposed in pores which are formed by arranging the active material, and further comprising the step of coating a mixture, in which the hygroscopic material and a binder are mixed in a solvent, on the current collector before the step (1). The mixture coated on the current collector may further comprise a conductive agent if necessary, and an amount of the hygroscopic material included in each position may be controlled by appropriately adjusting an amount of the hygroscopic material used in each step.

The hygroscopic material disposed in the pores formed by arranging the active material and the hygroscopic material disposed between the active material and the current collector may have a weight ratio of 99.9:0.1 to 80:20, particularly 99.5:0.5 to 90:10, and more particularly 99:1 to 95:5.

A method of disposing the hygroscopic material on the surface of the active material, between the active material and the current collector, and in the pores formed by arranging the active material is not particularly limited, but, for example, it may be performed by a method including the steps of: (1) closely attaching a hygroscopic material to a surface of an active material by dry mixing or hard mixing of the active material and the hygroscopic material; and (2) coating a slurry including the active material having the hygroscopic material closely attached to the surface thereof, which is obtained in the step (1), on a current collector to form an active material layer, and further comprising the step of coating a mixture, in which the hygroscopic material and a binder are mixed in a solvent, on the current collector before the step (2). The mixture coated on the current collector may further comprise a conductive agent if necessary, and an amount of the hygroscopic material included in each position may be controlled by appropriately adjusting an amount of the hygroscopic material used in each step.

The hygroscopic material disposed in the pores formed by arranging the active material, the hygroscopic material disposed on the surface of the active material, and the hygroscopic material disposed between the active material and the current collector may have a weight ratio of 99.9:0.05:0.05 to 80:10:10, particularly 99.5:0.25:0.25 to 90:5:5, and more particularly 99:0.5:0.5 to 95:2.5:2.5.

As described above, when the hygroscopic material is disposed in other than in the pores, the amount of the hygroscopic material to the amount of the hygroscopic material disposed in the pores may have a weight ratio of 99.9:0.1 to 80:20, and, in a case in which the amount of the hygroscopic material disposed in other than in the pores is 0.1 part by weight or more based on 99.9 parts by weight of the hygroscopic material disposed in the pores, the battery performance may be improved by increasing the moisture absorption effect by disposing a small amount of the hygroscopic material in other than in the pores. In a case in which the amount of the hygroscopic material disposed in other than in the pores is 20 parts by weight or less based on 80 parts by weight of the hygroscopic material disposed in the pores, it is possible to prevent a problem in which the volume of the active material layer is excessively increased because the amount of the hygroscopic material disposed in other than in the pores is excessively large or the energy density per unit volume is reduced accordingly.

In the electrode for a lithium secondary battery according to an embodiment of the present invention, the active material layer may have a moisture content of 3 wt % or less, particularly 0.1 wt % to 2 wt %, and more particularly 0.5 wt % to 1.5 wt %.

The electrode for a lithium secondary battery may be a negative electrode or a positive electrode, and may specifically be a negative electrode.

The present invention provides a lithium secondary battery including the above electrode.

The lithium secondary battery may include a positive electrode, a negative electrode, and a separator disposed between the positive electrode and the negative electrode.

In a case in which the hygroscopic material is included in an active material layer, the positive electrode may be prepared by the above-described method of preparing an electrode according to the position of the hygroscopic material included, and, in a case in which the hygroscopic material is not included in the active material layer, the positive electrode may be prepared by a typical method known in the art. For example, a binder, a conductive agent, and a dispersant, if necessary, as well as a solvent are mixed with a positive electrode active material and stirred to prepare a slurry, and a metal current collector is then coated with the slurry and pressed. Thereafter, the positive electrode may be prepared by drying the metal current collector.

Examples of the positive electrode active material may be a layered compound, such as lithium cobalt oxide ($LiCoO_2$); lithium nickel oxide ($LiNiO_2$); $Li[Ni_aCo_bMn_cM^1_d]O_2$ (where $M^1$ is any one selected from the group consisting of aluminum (Al), gallium (Ga), and indium (In), or two or more elements thereof, and $0.3 \le a < 0.1$, $0 \le b \le 0.5$, $0 \le c \le 0.5$, $0 \le d \le 0.1$, and $a+b+c+d=1$); $Li(Li_eM^2_{f-e-f}M^3_{f'})O_{2-g}A_g$ (where $0 \le e \le 0.2$, $0.6 \le f \le 1$, $0 \le f' \le 0.2$, and $0 \le g \le 0.2$, $M^2$ includes manganese (Mn) and at least one selected from the group consisting of nickel (Ni), cobalt (Co), iron (Fe), chromium (Cr), vanadium (V), copper (Cu), zinc (Zn), and titanium (Ti), $M^3$ is at least one selected from the group consisting of Al, magnesium (Mg), and boron (B), and A is at least one selected from the group consisting of phosphorous (P), fluorine (F), sulfur (S), and nitrogen (N)), or a compound substituted with at least one transition metal; lithium manganese oxides such as $Li_{1+h}Mn_{2-h}O_4$ (where $0 \le h \le 0.33$), $LiMnO_3$, $LiMn_2O_3$, and $LiMnO_2$; lithium copper oxide ($Li_2CuO_2$); vanadium oxides such as $LiV_3O_8$, $V_2O_5$, and $Cu_2V_2O_7$; Ni-site type lithium nickel oxide represented by the chemical formula $LiNi_{1-i}M^4_iO_2$ (where $M^4$ is Co, Mn, Al, Cu, Fe, Mg, B, or Ga, and $0.01 \le i \le 0.3$); lithium manganese complex oxide represented by the chemical formula $LiMn_{2-j}M^5_jO_2$ (where $M^5$ is Co, Ni, Fe, Cr, Zn, or tantalum (Ta), and $0.01 \le j \le 0.1$) or $Li_2Mn_3M^6O_8$ (where $M^6$ is Fe, Co, Ni, Cu, or Zn); $LiMn_2O_4$ having a part of lithium (Li) being substituted with alkaline earth metal ions; a disulfide compound; $LiFe_3O_4$, and $Fe_2(MoO_4)_3$. However, the positive electrode active material is not limited thereto.

Any metal may be used as the metal current collector so long as it is a metal having high conductivity as well as no reactivity in a voltage range of the battery to which the slurry of the electrode active material may be easily adhered, and, for example, stainless steel, aluminum, nickel, titanium, fired carbon, or aluminum or stainless steel that is surface-treated with one of carbon, nickel, titanium, silver, or the like may be used. Also, the current collector may have an uneven surface to improve the bonding strength of the positive electrode active material. The current collector may be used in various shapes, such as that of a film, a sheet, a foil, a net, a porous body, a foam body, a non-woven fabric body, and the like, and may have a thickness of 3 μm to 500 μm.

An organic solvent, such as N-methylpyrrolidone (NMP), dimethylformamide (DMF), acetone, and dimethylacetamide, or water, may be used as the solvent for forming the positive electrode. These solvents may be used alone or in a mixture of two or more thereof. An amount of the solvent used may be sufficient if the solvent may dissolve and disperse the positive electrode active material, the binder, and the conductive agent in consideration of a coating thickness of the slurry and manufacturing yield.

Various types of binder polymers, such as a polyvinylidene fluoride-hexafluoropropylene copolymer (PVDF-co-HEP), polyvinylidene fluoride, polyacrylonitrile, polymethylmethacrylate, polyvinyl alcohol, carboxymethyl cellulose (CMC), starch, hydroxypropyl cellulose, regenerated cellulose, polyvinylpyrrolidone, tetrafluoroethylene, polyethylene, polypropylene, polyacrylate, an ethylene-propylene-diene monomer (EPDM), a sulfonated EPDM, a styrene-butadiene rubber (SBR), a fluorine rubber, poly (acrylic acid), polymers in which hydrogens thereof are substituted with Li, sodium (Na), or calcium (Ca), or various copolymers, may be used as the binder.

Any conductive agent may be used without particular limitation so long as it has suitable conductivity without causing adverse chemical changes in the batteries. For example, the conductive agent may include a conductive material such as: graphite such as natural graphite or artificial graphite; carbon black such as acetylene black, Ketjen black, channel black, furnace black, lamp black, and thermal black; conductive fibers such as carbon fibers and metal fibers; conductive tubes such as carbon nanotubes; metal powder such as fluorocarbon powder, aluminum powder, and nickel powder; conductive whiskers such as zinc oxide whiskers and potassium titanate whiskers; conductive metal oxide such as titanium oxide; or polyphenylene derivatives.

An aqueous dispersant or an organic dispersant, such as N-methyl-2-pyrrolidone, may be used as the dispersant.

For example, a mixture of a negative electrode active material, a conductive agent, and a binder is mixed with a predetermined solvent to prepare a slurry, and the negative electrode may then be prepared by coating a negative electrode collector with the slurry and drying the negative electrode collector.

A carbon material, lithium metal, silicon, or tin, which may intercalate and deintercalate lithium ions, may be typically used as a negative electrode active material that is used in the negative electrode. For example, the carbon material may be used and both low crystalline carbon and high crystalline carbon may be used as the carbon material. Typical examples of the low crystalline carbon may be soft carbon and hard carbon, and typical examples of the high crystalline carbon may be natural graphite, Kish graphite, pyrolytic carbon, mesophase pitch-based carbon fibers, meso-carbon microbeads, mesophase pitches, and high-temperature sintered carbon such as petroleum or coal tar pitch derived cokes.

In general, the negative electrode collector may have a thickness of 3 μm to 500 μm. The negative electrode collector is not particularly limited so long as it has conductivity without causing adverse chemical changes in the batteries, and, for example, copper, gold, stainless steel, aluminum, nickel, titanium, fired carbon, copper or stainless steel that is surface-treated with one of carbon, nickel, titanium, silver, or the like, an aluminum-cadmium alloy, or the like may be used. Also, the negative electrode collector may have a fine roughness surface to improve bonding strength of the negative electrode active material. The negative electrode collector may be used in various shapes such as a film, a sheet, a foil, a net, a porous body, a foam body, a non-woven fabric body, and the like.

The binder may be used for maintaining a molded article by binding negative electrode active material particles, wherein the binder is not particularly limited as long as it is typically used in the preparation of the slurry for a negative electrode active material, but, for example, as a non-aqueous binder, polyvinyl alcohol, carboxymethyl cellulose, hydroxypropyl cellulose, diacetylene cellulose, polyvinyl chloride, polyvinylpyrrolidone, polytetrafluoroethylene (PTFE), polyvinylidene fluoride (PVdF), polyethylene, or polypropylene may be used, and, as a aqueous binder, any one selected from the group consisting of an acrylonitrile-butadiene rubber, a styrene-butadiene rubber, and an acryl rubber or a mixture of two or more thereof may be used.

Since the aqueous binder, different from the non-aqueous binder, may be economical and environmentally friendly, may not be harmful to the health of workers, and may have binding effect larger than that of the non-aqueous binder, a ratio of the active material for the same volume may be increased. Thus, the capacity of the lithium secondary battery may be increased, and a styrene-butadiene rubber may be used as the aqueous binder.

The binder may be included in an amount of 10 wt % or less based on a total weight of the slurry for a negative electrode active material, and may be specifically included in an amount of 0.1 wt % to 10 wt %. In a case in which the amount of the binder is less than 0.1 wt %, it is not desirable because an effect due to the use of the binder is insignificant, and, in a case in which the amount of the binder is greater than 10 wt %, it is not desirable because capacity per volume may be reduced due to a decrease in the relative amount of the active material according to the increase in the amount of the binder.

Any conductive agent may be used without particular limitation so long as it has suitable conductivity without causing adverse chemical changes in the batteries, and examples of the conductive agent may be a conductive material such as: graphite such as natural graphite or artificial graphite; carbon black such as acetylene black, Ketjen black, channel black, furnace black, lamp black, and thermal black; conductive fibers such as carbon fibers and metal fibers; conductive tubes such as carbon nanotubes; metal powder such as fluorocarbon powder, aluminum powder, and nickel powder; conductive whiskers such as zinc oxide whiskers and potassium titanate whiskers; conductive metal oxide such as titanium oxide; or polyphenylene derivatives. The conductive agent may be used in an amount of 1 wt % to 9 wt % based on the total weight of the slurry for a negative electrode active material.

An organic solvent, such as N-methylpyrrolidone (NMP), dimethylformamide (DMF), acetone, and dimethylacetamide, or water, may be used as the solvent for forming the negative electrode. These solvents may be used alone or in a mixture of two or more thereof. An amount of the solvent used may be sufficient if the solvent may dissolve and disperse the negative electrode active material, the binder, and the conductive agent in consideration of a coating thickness of the slurry and manufacturing yield.

The negative electrode may further include a thickener for viscosity control, if necessary. The thickener may be a cellulose-based compound, and, for example, may be at least one selected from the group consisting of carboxymethyl cellulose (CMC), hydroxy methyl cellulose, hydroxy ethyl cellulose, and hydroxy propyl cellulose. Specifically, the thickener may be CMC, and the negative electrode active material and the binder may be used in the negative electrode by being dispersed with the thickener in water.

A typical porous polymer film used as a typical separator, for example, a porous polymer film prepared from a polyolefin-based polymer, such as an ethylene homopolymer, a propylene homopolymer, an ethylene-butene copolymer, an ethylene-hexene copolymer, and an ethylene-methacrylate copolymer, may be used alone or in a lamination therewith as the separator. Also, a typical porous nonwoven fabric, for example, a nonwoven fabric formed of high melting point glass fibers or polyethylene terephthalate fibers may be used, but the present invention is not limited thereto.

A lithium salt, which may be included as the electrolyte used in the present invention, may be used without limitation so long as it is typically used in an electrolyte for a lithium secondary battery. For example, any one selected from the group consisting of $F^-$, $Cl^-$, $Br^-$, $I^-$, $NO_3^-$, $N(CN)_2^-$, $BF_4^-$, $ClO_4^-$, $PF_6^-$, $(CF_3)_2PF_4^-$, $(CF_3)_3PF_3^-$, $(CF_3)_4PF_2^-$, $(CF_3)_5PF^-$, $(CF_3)_6P^-$, $CF_3SO_3^-$, $CF_3CF_2SO_3^-$, $(CF_3SO_2)_2N^-$, $(FSO_2)_2N^-$, $CF_3CF_2(CF_3)_2CO^-$, $(CF_3SO_2)_2CH^-$, $(SF_5)_3C^-$, $(CF_3SO_2)_3C^-$, $CF_3(CF_2)_7SO_3^-$, $CF_3CO_2^-$, $CH_3CO_2^-$, $SCN^-$, and $(CF_3CF_2SO_2)_2N^-$ may be used as an anion of the lithium salt.

The electrolyte used in the present invention may include an organic liquid electrolyte, an inorganic liquid electrolyte, a solid polymer electrolyte, a gel-type polymer electrolyte, a solid inorganic electrolyte, and a molten inorganic electrolyte which may be used in the preparation of the lithium secondary battery, but the present invention is not limited thereto.

A shape of the lithium secondary battery of the present invention is not particularly limited, and for example, a cylindrical type using a can, a prismatic type, a pouch type, or a coin type may be used.

The lithium secondary battery according to the present invention may not only be used in a battery cell that is used as a power source of a small device, but may also be used as a unit cell in a medium and large sized battery module including a plurality of battery cells.

Preferred examples of the medium and large sized device may be an electric vehicle, a hybrid electric vehicle, a plug-in hybrid electric vehicle, or a power storage system, but the medium and large sized device is not limited thereto.

EXAMPLES

Hereinafter, the present invention will be described in more detail, according to examples and experimental example, but the present invention is not limited thereto. The invention may be embodied in many different forms and should not be construed as being limited to the embodiments set forth herein. Rather, these example embodiments are provided so that this description will be thorough and complete, and will fully convey the scope of the present invention to those skilled in the art.

Example 1: Preparation of Negative Electrode for Lithium Secondary Battery Including Hygroscopic Material A negative electrode slurry was prepared by mixing 86 wt % of graphite having an average particle diameter of 25 µm as a negative electrode active material, 1 wt % of Denka black (conductive agent), 2 wt % of SBR (binder), and 1 wt % of CMC (thickener) with NMP as a solvent. The prepared negative electrode active material slurry was coated on one surface of a 10 µm thick copper (Cu) thin film, as a negative electrode collector, to a thickness of 65 µm to form an active material layer and the active material layer was dried. Then, a mixed solution, in which silica gel having an average particle diameter ($D_{50}$) of 0.5 µm, as a hygroscopic material, was mixed with NMP so as to be included in an amount of 1/10 part by weight based on the amount of the graphite, was slowly infiltrated into the active material layer for 30 minutes. When the infiltration of the mixed solution was completed, the active material layer was dried and rolled, and a negative electrode was then prepared by punching into a predetermined size.

Examples 2 to 5

Negative electrodes were prepared in the same manner as in Example 1 except that the particle diameter of the silica gel was changed as illustrated in Table 1 below.

Examples 6 to 10

Negative electrodes were prepared in the same manner as in Example 1 except that hygroscopic materials having different sizes and/or types, as illustrated in the following Table 1, were used as the hygroscopic material instead of the silica gel having an average particle diameter ($D_{50}$) of 0.5 µm.

Example 11

100 parts by weight of graphite having an average particle diameter of 25 µm and 1 part by weight of silica gel having an average particle diameter ($D_{50}$) of 0.5 µm, as a hygroscopic material, were dry-mixed at a stirring speed of 25 rpm for 30 minutes to prepare graphite having the silica gel closely attached to the surface thereof.

A negative electrode slurry was prepared by mixing 86 wt % of the graphite having the silica gel closely attached to the surface thereof as a negative electrode active material, wt % of Denka black (conductive agent), 2 wt % of SBR (binder), and 1 wt % of CMC (thickener) with NMP as a solvent. The prepared negative electrode active material slurry was coated on one surface of a 10 µm thick copper (Cu) thin film, as a negative electrode collector, to a thickness of 65 µm to form an active material layer and the active material layer was dried. Then, a mixed solution, in which silica gel having an average particle diameter ($D_{50}$) of 0.5 µm, as a hygroscopic material, was mixed with NMP so as to be included in an amount of 9/100 part by weight based on the amount of the graphite, was slowly infiltrated into the active material layer for 30 minutes. When the infiltration of the mixed solution was completed, the active material layer was dried and rolled, and a negative electrode was then prepared by punching into a predetermined size.

Example 12

A negative electrode was prepared in the same manner as in Example 11 except that a mixture, in which silica gel having an average particle diameter ($D_{50}$) of 2 µm and $P_2O_5$ having an average particle diameter ($D_{50}$) of 100 nm were mixed in a weight ratio of 80:20, was used as the hygroscopic material instead of the silica gel having an average particle diameter ($D_{50}$) of 0.5 µm in Example 11.

Example 13

100 parts by weight of graphite having an average particle diameter of 25 µm and a mixture, in which 3 parts by weight of silica gel having an average particle diameter ($D_{50}$) of 2 μm and $P_2O_5$ having an average particle diameter ($D_{50}$) of 100 nm were mixed in a weight ratio of 80:20, as a hygroscopic material, were dry-mixed at a stirring speed of 25 rpm for 30 minutes to prepare graphite having the silica gel and $P_2O_5$ closely attached to the surface thereof.

A negative electrode slurry was prepared by mixing 86 wt % of the graphite having the silica gel and $P_2O_5$ closely attached to the surface thereof as a negative electrode active material, 1 wt % of Denka black (conductive agent), 2 wt % of SBR (binder), and 1 wt % of CMC (thickener) with NMP as a solvent. The prepared negative electrode active material slurry was coated on one surface of a 10 μm thick copper (Cu) thin film, as a negative electrode collector, to a thickness of 65 μm to form an active material layer and the active material layer was dried. Then, a mixed solution, in which a mixture, in which silica gel having an average particle diameter ($D_{50}$) of 2 μm and $P_2O_5$ having an average particle diameter ($D_{50}$) of 100 nm were mixed in a weight ratio of 80:20, as a hygroscopic material, was mixed with NMP so as to be included in an amount of 7/100 part by weight based on the amount of the graphite, was slowly infiltrated into the active material layer for 30 minutes. When the infiltration of the mixed solution was completed, the active material layer was dried and rolled, and a negative electrode was then prepared by punching into a predetermined size.

Example 14

A mixture, in which 80 parts by weight of silica gel having a particle diameter of 0.5 μm, 1 part by weight of Denka black (conductive agent), and 2 parts by weight of SBR (binder) were mixed with NMP as a solvent, was coated on one surface of a 10 μm thick copper (Cu) thin film, as a negative electrode collector, to a thickness of 2 μm and the coated negative electrode collector was then dried. In this case, an amount of the silica gel used was 1/100 part by weight based on the amount of graphite as a negative electrode active material.

A negative electrode slurry was prepared by mixing 86 wt % of the graphite having an average particle diameter of 25 μm as the negative electrode active material, 1 wt % of Denka black (conductive agent), 2 wt % of SBR (binder), and 1 wt % of CMC (thickener) with NMP as a solvent. The prepared negative electrode active material slurry was coated on the copper thin film having the mixture coated thereon to a thickness of 65 μm to form an active material layer and the active material layer was dried. Then, a mixed solution, in which silica gel having a particle diameter of 0.5 μm, as a hygroscopic material, was mixed with NMP so as to be included in an amount of 9/100 part by weight based on the amount of the graphite, was slowly infiltrated into the active material layer for 30 minutes. When the infiltration of the mixed solution was completed, the active material layer was dried and rolled, and a negative electrode was then prepared by punching into a predetermined size.

Example 15

A negative electrode was prepared in the same manner as in Example 14 except that a mixture, in which silica gel having an average particle diameter ($D_{50}$) of 2 μm and silica gel having an average particle diameter ($D_{50}$) of 100 nm were mixed in a weight ratio of 80:20, was used as the hygroscopic material instead of the silica gel having an average particle diameter ($D_{50}$) of 0.5 μm in Example 14.

Example 16

A mixture, in which 80 parts by weight of a mixture, in which silica gel having an average particle diameter ($D_{50}$) of 2 μm and $P_2O_5$ having an average particle diameter ($D_{50}$) of 100 nm were mixed in a weight ratio of 80:20, 1 part by weight of Denka black (conductive agent), and 2 parts by weight of SBR (binder) were mixed with NMP as a solvent, was coated on one surface of a 10 μm thick copper (Cu) thin film, as a negative electrode collector, to a thickness of 2 μm and the coated negative electrode collector was then dried. In this case, an amount of the mixture used was 1/10 part by weight based on the amount of graphite as a negative electrode active material.

A negative electrode slurry was prepared by mixing 86 wt % of the graphite having an average particle diameter of 25 μm as the negative electrode active material, 1 wt % of Denka black (conductive agent), 2 wt % of SBR (binder), and 1 wt % of CMC (thickener) with NMP as a solvent. The prepared negative electrode active material slurry was coated on the copper thin film having the mixture coated thereon to a thickness of 65 μm to form an active material layer and the active material layer was dried. Then, a mixed solution, in which a mixture, in which silica gel having an average particle diameter ($D_{50}$) of 2 μm and $P_2O_5$ having an average particle diameter ($D_{50}$) of 100 nm were mixed in a weight ratio of 80:20, as a hygroscopic material, was mixed with NMP so as to be included in an amount of 9/100 part by weight based on the amount of the graphite, was slowly infiltrated into the active material layer for 30 minutes. When the infiltration of the mixed solution was completed, the active material layer was dried and rolled, and a negative electrode was then prepared by punching into a predetermined size.

Example 17

100 parts by weight of graphite having an average particle diameter of 25 μm and 0.5 part by weight of silica gel having a particle diameter of 0.5 μm were dry-mixed and hard-mixed to prepare graphite having the silica gel closely attached to the surface thereof.

A mixture, in which 80 parts by weight of silica gel having a particle diameter of 0.5 μm, 1 part by weight of Denka black (conductive agent), and 2 parts by weight of SBR (binder) were mixed with NMP as a solvent, was coated on one surface of a 10 μm thick copper (Cu) thin film, as a negative electrode collector, to a thickness of 2 μm and the coated negative electrode collector was then dried. In this case, an amount of the silica gel used was 1/200 part by weight based on the amount of the graphite as a negative electrode active material.

A negative electrode slurry was prepared by mixing 86 wt % of the graphite having the silica gel closely attached to the surface thereof as the negative electrode active material, 1 wt % of Denka black (conductive agent), 2 wt % of SBR (binder), and 1 wt % of CMC (thickener) with NMP as a solvent. The prepared negative electrode active material slurry was coated on the copper thin film having the mixture coated thereon to a thickness of 65 μm to form an active material layer and the active material layer was dried. Then, a mixed solution, in which silica gel having a particle diameter of 0.5 μm, as a hygroscopic material, was mixed with NMP so as to be included in an amount of 9/100 part by weight based on the amount of the graphite, was slowly infiltrated into the active material layer for 30 minutes. When the infiltration of the mixed solution was completed, the active material layer was dried and rolled, and a negative electrode was then prepared by punching into a predetermined size.

Example 18

A negative electrode was prepared in the same manner as in Example 17 except that a hygroscopic material having different size and/or type, as illustrated in the following Table 1, was used as the hygroscopic material instead of the silica gel having a particle diameter of 0.5 μm in Example 17.

Example 19

100 parts by weight of graphite having an average particle diameter of 25 μm and a mixture, in which silica gel having an average particle diameter ($D_{50}$) of 2 μm and $P_2O_5$ having an average particle diameter ($D_{50}$) of 100 nm were mixed in a weight ratio of 80:20, were dry-mixed and hard-mixed to prepare graphite having the mixture of silica gel and $P_2O_5$ closely attached to the surface thereof.

A mixture, in which 80 parts by weight of the mixture, in which silica gel having an average particle diameter ($D_{50}$) of 2 μm and $P_2O_5$ having an average particle diameter ($D_{50}$) of 100 nm were mixed in a weight ratio of 80:20, 1 part by weight of Denka black (conductive agent), and 2 parts by weight of SBR (binder) were mixed with NMP as a solvent, was coated on one surface of a 10 μm thick copper (Cu) thin film, as a negative electrode collector, to a thickness of 2 μm and the coated negative electrode collector was then dried. In this case, an amount of the silica gel used was 2/100 part by weight based on the amount of the graphite as a negative electrode active material.

A negative electrode slurry was prepared by mixing 86 wt % of the graphite having the mixture of silica gel and $P_2O_5$ closely attached to the surface thereof as the negative electrode active material, 1 wt % of Denka black (conductive agent), 2 wt % of SBR (binder), and 1 wt % of CMC (thickener) with NMP as a solvent. The prepared negative electrode active material slurry was coated on the copper thin film having the mixture coated thereon to a thickness of 65 μm to form an active material layer and the active material layer was dried. Then, a mixed solution, in which the mixture, in which silica gel having an average particle diameter ($D_{50}$) of 2 μm and $P_2O_5$ having an average particle diameter ($D_{50}$) of 100 nm were mixed in a weight ratio of 80:20, as a hygroscopic material, was mixed with NMP so as to be included in an amount of 6/100 part by weight based on the amount of the graphite, was slowly infiltrated into the active material layer for 30 minutes. When the infiltration of the mixed solution was completed, the active material layer was dried and rolled, and a negative electrode was then prepared by punching into a predetermined size.

Example 20

A negative electrode slurry was prepared by mixing 86 wt % of graphite having an average particle diameter of 25 μm as a negative electrode active material, 1 wt % of Denka black (conductive agent), 2 wt % of SBR (binder), and 1 wt % of CMC (thickener) with NMP as a solvent. The prepared negative electrode active material slurry was coated on one surface of a 10 μm thick copper (Cu) thin film, as a negative electrode collector, to a thickness of 65 μm to form an active material layer and the active material layer was dried. Then, a mixed solution, in which a mixture, in which silica gel having an average particle diameter ($D_{50}$) of 2 μm and $P_2O_5$ having an average particle diameter ($D_{50}$) of 5 nm were mixed in a weight ratio of 80:20, as a hygroscopic material, was mixed with NMP so as to be included in an amount of 9/100 part by weight based on the amount of the graphite, was slowly infiltrated into the active material layer for 30 minutes. When the infiltration of the mixed solution was completed, the active material layer was dried and rolled, and a negative electrode was then prepared by punching into a predetermined size.

Comparative Example 1

100 parts by weight of graphite having an average particle diameter of 25 μm and 10 parts by weight of silica gel having a particle diameter of 0.5 μm were dry-mixed and hard-mixed to prepare graphite having the silica gel closely attached to the surface thereof.

A negative electrode slurry was prepared by mixing 86 wt % of the graphite having the silica gel closely attached to the surface thereof as a negative electrode active material, 1 wt % of Denka black (conductive agent), 2 wt % of SBR (binder), and 1 wt % of CMC (thickener) with NMP as a solvent. The prepared negative electrode active material slurry was coated on one surface of a 10 μm thick copper (Cu) thin film, as a negative electrode collector, to a thickness of 65 μm to form an active material layer. The active material layer was dried and rolled, and a negative electrode was then prepared by punching into a predetermined size.

Comparative Example 2

A mixture, in which 80 parts by weight of silica gel having a particle diameter of 0.5 μm, 1 part by weight of Denka black (conductive agent), and 2 parts by weight of SBR (binder) were mixed with NMP as a solvent, was coated on one surface of a 10 μm thick copper (Cu) thin film, as a negative electrode collector, to a thickness of 2 μm and the coated negative electrode collector was then dried.

A negative electrode slurry was prepared by mixing 86 wt % of graphite having an average particle diameter of 25 μm as a negative electrode active material, 1 wt % of Denka black (conductive agent), 2 wt % of SBR (binder), and 1 wt % of CMC (thickener) with NMP as a solvent. The prepared negative electrode active material slurry was coated on the copper thin film having the mixture coated thereon to a thickness of 65 μm to form an active material layer. The active material layer was dried and rolled, and a negative electrode was then prepared by punching into a predetermined size.

TABLE 1

| Example | Hygroscopic material | Mixing ratio (weight ratio) of hygroscopic material | Average particle diameter ($D_{50}$) | Position of hygroscopic material (content ratio) |
|---|---|---|---|---|
| 1 | Silica gel | — | 0.5 μm | Pore |
| 2 | Silica gel | — | 5 μm | Pore |
| 3 | Silica gel | — | 100 nm | Pore |
| 4 | Silica gel | — | 30 μm | Pore |
| 5 | Silica gel | — | 5 nm | Pore |
| 6 | Silica gel/silica gel | 80:20 | 2 μm/100 nm | Pore |
| 7 | Silica gel/$P_2O_5$ | 80:20 | 2 μm/100 nm | Pore |
| 8 | Silica gel/$P_2O_5$ | 80:20 | 2 μm/2 μm | Pore |
| 9 | Silica gel/$P_2O_5$ | 30:70 | 2 μm/100 nm | Pore |
| 10 | Silica gel/$P_2O_5$ | 99.5:0.5 | 2 μm/100 nm | Pore |
| 11 | Silica gel | — | 0.5 μm | Pore, surface of active material (90:10) |
| 12 | Silica gel/$P_2O_5$ | 80:20 | 2 μm/100 nm | Pore, surface of active material (90:10) |
| 13 | Silica gel/$P_2O_5$ | 80:20 | 2 μm/100 nm | Pore, surface of active material (70:30) |
| 14 | Silica gel | — | 0.5 μm | Pore, between active material and current collector (90:10) |
| 15 | Silica gel/silica gel | 80:20 | 2 μm/100 nm | Pore, between active material and current collector (90:10) |
| 16 | Silica gel/$P_2O_5$ | 80:20 | 2 μm/100 nm | Pore, between active material and current collector (70:30) |
| 17 | Silica gel | — | 0.5 μm | Pore, surface of active material, between active material and current collector (90:5:5) |
| 18 | Silica gel/silica gel | 80:20 | 2 μm/100 nm | Pore, surface of active material, between active material and current collector (90:5:5) |
| 19 | Silica gel/$P_2O_5$ | 80:20 | 2 μm/100 nm | Pore, surface of active material, between active material and current collector (60:20:20) |
| 20 | Silica gel/$P_2O_5$ | 80:20 | 2 μm/5 nm | Pore |
| Comparative Example 1 | Silica gel | — | 0.5 μm | Surface of active material |
| Comparative Example 2 | Silica gel | — | 0.5 μm | Between active material and current collector |

Examples 1-1 to 20-1: Preparation of Lithium Secondary Batteries Comprising Hygroscopic Material A 17 μm thick polyethylene porous membrane was disposed between each negative electrode prepared in Examples 1 to 20 and a lithium metal, and an electrolyte, in which 1M $LiPF_6$ was dissolved in a solvent having ethylene carbonate (EC) and diethyl carbonate (DEC) mixed at a volume ratio of 30:70, was then injected thereinto to prepare each coin-type half-cell.

Comparative Examples 1-1 and 2-1: Preparation of Lithium Secondary Batteries Comprising Hygroscopic Material A 17 μm thick polyethylene porous membrane was disposed between each negative electrode prepared in Comparative Examples 1 and 2 and a lithium metal, and an electrolyte, in which 1M $LiPF_6$ was dissolved in a solvent having ethylene carbonate (EC) and diethyl carbonate (DEC) mixed at a volume ratio of 30:70, was then injected thereinto to prepare each coin-type half-cell.

Experimental Example 1: Cycle Characteristic Evaluation Experiment

The following electrochemical evaluation experiments were conducted to investigate cycle characteristics of the coin-type half-cells obtained in Examples 1-1 to 20-1 and Comparative Examples 1-1 and 2-1.

Specifically, the coin-type half-cells obtained in Examples 1-1 to 20-1 and Comparative Examples 1-1 and 2-1 were charged at a constant current (CC) of 0.5 C to a voltage of 0.005 V at 25° C., and thereafter, charge in the first cycle was performed by charging the coin-type half-cells at a constant voltage (CV) of 0.005 V to a current of 0.005 C (cut-off current). After the coin-type half-cells were left standing for 20 minutes, the coin-type half-cells were discharged at a constant current (CC) of 0.5 C to a voltage of 1.5 V. This charge and discharge cycle was repeated 1 to 100 times. The measurement results of capacity retention ratios of the batteries after 100 cycles are presented in FIG. 4.

Figure 4:
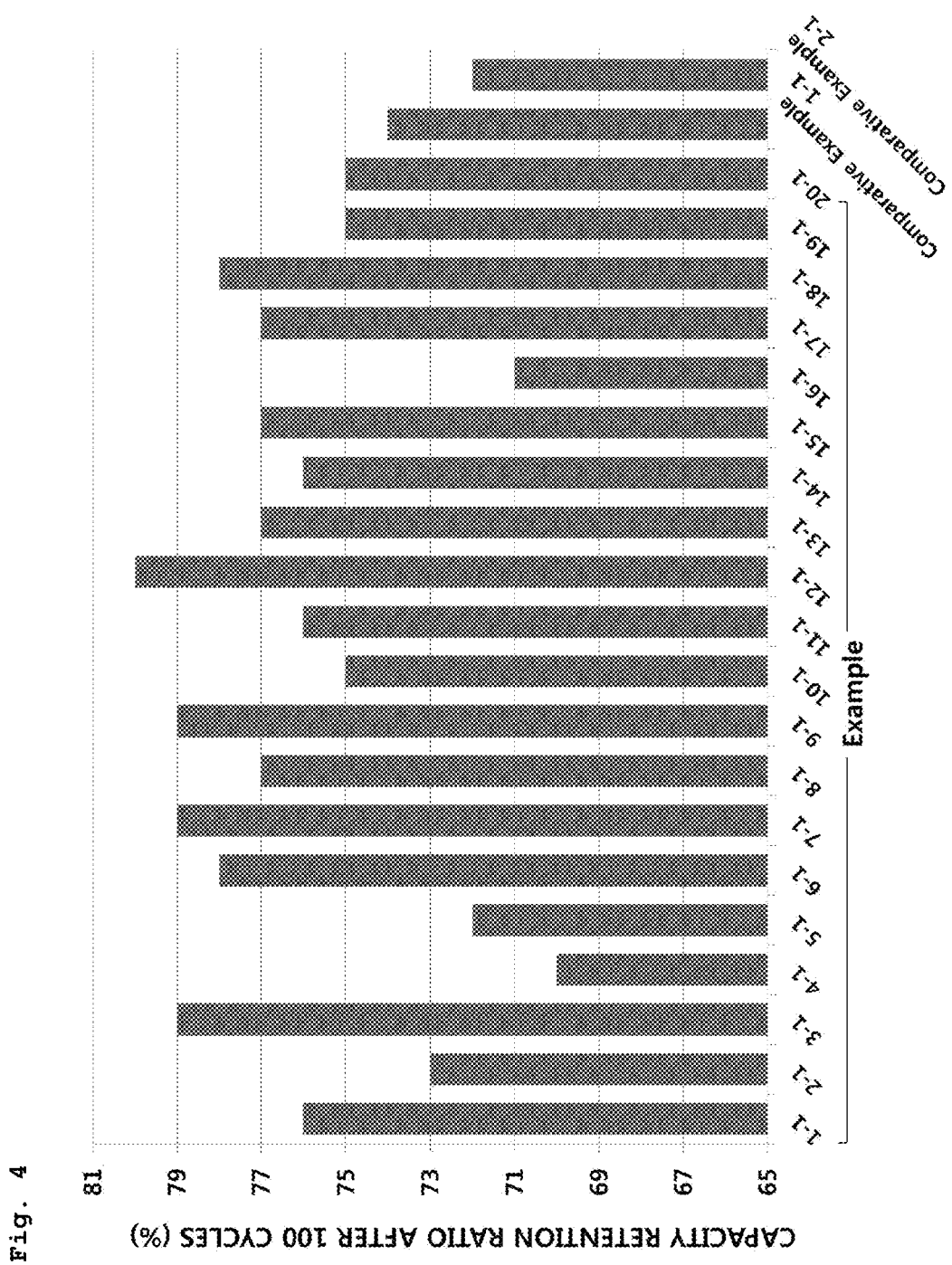
FIG. 4 is a graph illustrating the measurement results of capacity retention ratios of batteries of Examples 1-1 to 19-1 and Comparative Examples 1-1 to 3-1 after 100 cycles.

Referring to FIG. 4, it may be understood that the capacity retention ratio after 100 cycles of the battery including the hygroscopic material having a small particle diameter was better than that of the battery including the hygroscopic material having a large particle diameter. Specifically, referring to the results of Examples 1-1 to 4-1, it may be understood that cycle performance was improved if the particle diameter of the hygroscopic material was small. However, as confirmed in Example 5-1, in a case in which the particle diameter of the hygroscopic material was excessively small, it may be confirmed that, since the consumption of an electrolyte solution was increased due to a side reaction of the electrolyte solution on the surface of the hygroscopic material, it may adversely affect the cycle performance.

It may be also confirmed that the capacity retention ratio after 100 cycles was changed according to the position of the hygroscopic material. Specifically, when comparing the results of Example 1-1 and Comparative Examples 1-1 and 2-1, it may be confirmed that there was a difference in the capacity retention ratio after 100 cycles according to the position of the hygroscopic material even if the type of the hygroscopic material was the same, the capacity retention ratio was better when the hygroscopic material was disposed in the pores in comparison to when the hygroscopic material was disposed on the surface of the active material or between the active material and the current collector, and the capacity retention ratio was relatively better when the hygroscopic material was disposed on the surface of the active material in comparison to when the hygroscopic material was disposed between the active material and the current collector.

In a case in which two hygroscopic materials having different sizes and two different types of the hygroscopic materials were mixed and used, it may be understood that the capacity retention ratio after 100 cycles was higher than the other cases.

The invention claimed is:

1. The electrode for a lithium secondary battery comprising an active material layer and a current collector, wherein the active material layer comprises an active material and a hygroscopic material, and the hygroscopic material is disposed in pores which are formed by arranging the active material in the active material layer, wherein the hygroscopic material is further disposed between the active material layer and the current collector other than in the pores, and the hygroscopic material disposed in the pores and the hygroscopic material disposed between the active material layer and the current collector have a weight ratio of 99.9:0.1 to 80:20.

2. The electrode for a lithium secondary battery of claim 1, wherein the active material layer has a moisture content of 3 wt % or less.

3. A lithium secondary battery comprising the electrode of claim 1.

4. The electrode for a lithium secondary battery of claim 1, wherein the hygroscopic material comprises at least one selected from the group consisting of silica gel, zeolite, CaO, BaO, $MgSO_4$, $Mg(ClO_4)_2$, MgO, $P_2O_5$, $Al_2O_3$, $CaH_2$, NaH, $LiAlH_4$, $CaSO_4$, $Na_2SO_4$, $CaCO_3$, $K_2CO_3$, $CaCl_2$, 4A and 3A molecular sieves, $Ba(ClO_4)_2$, crosslinked poly(acrylic acid), and poly(acrylic acid).

5. The electrode for a lithium secondary battery of claim 1, wherein the active material has an average particle diameter ($D_{50}$) of 0.1 μm to 30 μm.

6. The electrode for a lithium secondary battery of claim 1, wherein the pore has a diameter of 0.01 μm to 20 μm.

7. The electrode for a lithium secondary battery of claim 1, wherein the hygroscopic material has an average particle diameter ($D_{50}$) of 0.1% to 70% of an average particle diameter ($D_{50}$) of the active material.

8. The electrode for a lithium secondary battery of claim 1, wherein the hygroscopic material is included in an amount of 1 part by weight to 20 parts by weight based on 100 parts by weight of the active material.

9. The electrode for a lithium secondary battery of claim 1, wherein the active material layer has a porosity of 10% to 40%.

10. The electrode for a lithium secondary battery comprising an active material layer and a current collector, wherein the active material layer comprises an active material and a hygroscopic material, and the hygroscopic material is disposed in pores which are formed by arranging the active material in the active material layer, wherein the hygroscopic material is further disposed on a surface of the active material and between the active material layer and the current collector other than in the pores, and the hygroscopic material disposed in the pores, the hygroscopic material disposed on the surface of the active material, and the hygroscopic material disposed between the active material layer and the current collector have a weight ratio of 99.9:0.05:0.05 to 80:10:10.

11. The method of preparing an electrode for a lithium secondary battery, the method comprising:
(1) coating a slurry including an active material on a current collector to form an active material layer;
(2) infiltrating a dispersion solution including a hygroscopic material into the active material layer to allow the hygroscopic material to be disposed in pores which are formed by arranging the active material; and
(3) coating a mixture, in which the hygroscopic material and a binder are mixed in a solvent, on the current collector before the step (1),
wherein the lithium secondary battery comprises the active material layer and the current collector, wherein the active material layer comprises the active material and the hygroscopic material, and the hygroscopic material is disposed in pores which are formed by arranging the active material in the active material layer.

12. The method of preparing an electrode for a lithium secondary battery, the method comprising:
(1) coating a slurry including an active material on a current collector to form an active material layer;
(2) infiltrating a dispersion solution including a hygroscopic material into the active material layer to allow the hygroscopic material to be disposed in pores which are formed by arranging the active material;
(3) closely attaching the hygroscopic material to a surface of the active material by dry mixing or hard mixing of the active material and the hygroscopic material before the step (1); and
(4) coating the mixture, in which the hygroscopic material and the binder are mixed in the solvent, on the current collector before the step (2), wherein the lithium secondary battery comprises the active material layer and the current collector, wherein the active material layer comprises the active material and the hygroscopic material, and the hygroscopic material is disposed in pores which are formed by arranging the active material in the active material layer.

* * * * *